US010592919B1

(12) United States Patent
Kaplan

(10) Patent No.: US 10,592,919 B1
(45) Date of Patent: Mar. 17, 2020

(54) DISTRIBUTED SOCIAL AD TECHNOLOGY

(71) Applicant: Craig Kaplan, Capitola, CA (US)

(72) Inventor: Craig Kaplan, Capitola, CA (US)

(73) Assignee: PredictWallStreet, LLC, Capitola, CA (US)

( * ) Notice: Subject to any disclaimer, the term of this patent is extended or adjusted under 35 U.S.C. 154(b) by 0 days.

(21) Appl. No.: 13/852,182

(22) Filed: Mar. 28, 2013

Related U.S. Application Data

(60) Provisional application No. 61/619,904, filed on Apr. 3, 2012.

(51) Int. Cl.
*G06Q 30/02* (2012.01)

(52) U.S. Cl.
CPC ................ *G06Q 30/0246* (2013.01)

(58) Field of Classification Search
CPC ..................................... G06Q 30/02
USPC ........................................... 705/14
See application file for complete search history.

(56) References Cited

U.S. PATENT DOCUMENTS

| | | | | |
|---|---|---|---|---|
| 6,236,975 | B1* | 5/2001 | Boe et al. | 705/7.32 |
| 6,379,251 | B1* | 4/2002 | Auxier | G06Q 30/02 273/269 |
| 7,155,510 | B1* | 12/2006 | Kaplan | G06Q 30/0202 705/7.31 |
| 8,521,663 | B1* | 8/2013 | Phillips et al. | 706/12 |
| 2004/0043810 | A1* | 3/2004 | Perlin | G06Q 30/02 463/16 |
| 2007/0112637 | A1* | 5/2007 | So | 705/26 |
| 2008/0059308 | A1* | 3/2008 | Gerken | G06Q 30/02 705/14.44 |
| 2008/0097830 | A1* | 4/2008 | Kim | G06Q 30/02 705/14.4 |
| 2011/0209072 | A1* | 8/2011 | Bennett | G06Q 30/02 715/760 |
| 2011/0231226 | A1* | 9/2011 | Golden | 705/7.32 |
| 2011/0282721 | A1* | 11/2011 | Dodson | G06Q 30/0241 705/14.14 |
| 2012/0270618 | A1* | 10/2012 | Abramoff et al. | 463/9 |

OTHER PUBLICATIONS

WooBox.com at https://web.archive.org/web/20110930233937/http://woobox.com/polls.*

* cited by examiner

*Primary Examiner* — Eric R Netzloff
(74) *Attorney, Agent, or Firm* — David Guerra

(57) ABSTRACT

In one embodiment, a method and computer program product of distributing advertisement for increasing click-thru-rate is provided. The method comprises establishing communication between at least one user computing device and at least one website through a network, and displaying an ad to a user through the website. The user is then requested to participate in at least one event by way of the ad. After the user clicks on the ad, the user then travels to an advertiser's website or the advertiser's website is displayed to the user. After which, the most current total of the results of the event are displayed to the user in real time.

14 Claims, 6 Drawing Sheets

DISTRIBUTED SOCIAL AD TECHNOLOGY

CROSS-REFERENCE TO RELATED APPLICATION

This application is an U.S. non-provisional utility application under 35 U.S.C. § 111(a) based upon U.S. provisional application 61/619,904 filed on Apr. 3, 2012. Additionally, this U.S. non-provisional utility application claims the benefit of priority of U.S. provisional application 61/619,904 filed on Apr. 3, 2012. The entire disclosure of the prior application is incorporated herein by reference.

FEDERALLY SPONSORED RESEARCH

Not applicable

SEQUENCE LISTING OR PROGRAM

Not applicable

BACKGROUND OF THE INVENTION

Field of the Invention

The present invention relates to a distributed social ad technology for use in connection with increasing click-thru-rate compared to other types of online ads.

Description of the Prior Art

Online advertising is a multi-billion dollar business worldwide. Currently, there are two dominant types of online advertising: display ads and text ads. With both types of ads, the effectiveness of the ad depends on how well the ad engages the attention of the user and causes the user to click on the ad. Click-thru-rate (CTR) is a key metric in this regard and is typically expressed as a percentage. For example, a 1% CTR means that on average, for every 100 times the ad is shown, one user clicks on the ad.

Many approaches have been tried to increase the CTR of an ad. Increasing the relevance of the ad to the user, often by using demographic information gathered about the user and his/her interests, is a common approach. Designing display ads to be visually engaging and appealing is another approach. Often advertisers will incorporate an offer into the ad in attempt to increase CTR.

In the vast majority of cases, the ad content is distinct from other types of non-ad content. Ads are typically placed adjacent to other useful content on a web page. For example, in the case of search ads, the search results are the useful content, and online ads appear above or to the side. On media sites, such as Yahoo!, online ads typically appear on the same page as content that is related to the ad in some way.

Distributed Social Ad Technology (hereinafter "DS Ad Tech") is a novel and useful approach for increasing CTR compared to other types of online ads. While the above-described devices fulfill their respective, particular objectives and requirements, the aforementioned patents do not describe a distributed social ad technology that allows increasing CTR compared to other types of online ads.

Therefore, a need exists for a new and improved distributed social ad technology that can be used for increasing CTR compared to other types of online ads. In this regard, the present invention substantially fulfills this need. In this respect, the distributed social ad technology according to the present invention substantially departs from the conventional concepts and designs of the prior art, and in doing so provides an apparatus primarily developed for the purpose of increasing CTR compared to other types of online ads.

SUMMARY OF THE INVENTION

In view of the foregoing disadvantages inherent in the known types of CTR increasing systems and methods now present in the prior art, the present invention provides an improved distributed social Ad technology, and overcomes the above-mentioned disadvantages and drawbacks of the prior art. As such, the general purpose of the present invention, which will be described subsequently in greater detail, is to provide a new and improved distributed social ad technology and method which has all the advantages of the prior art mentioned heretofore and many novel features that result in a distributed social ad technology which is not anticipated, rendered obvious, suggested, or even implied by the prior art, either alone or in any combination thereof.

To attain this, the present invention essentially comprises a method of distributing advertisement for increasing click-thru-rate. The method comprises establishing communication between at least one user computing device and at least one website through a network, and displaying an ad to a user through the website. The user is then requested to participate in at least one event by way of the ad. After which, the most current result of the event are displayed to the user in real time.

After the user participates in the event, an advertiser's website is then displayed to the user or the user travels to the advertiser's website.

There has thus been outlined, rather broadly, the more important features of the invention in order that the detailed description thereof that follows may be better understood and in order that the present contribution to the art may be better appreciated.

The invention may also include the displaying or presenting to the user an offer from the advertiser. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved distributed social ad technology that has all of the advantages of the prior art CTR increasing systems and methods, and none of the disadvantages.

It is another object of the present invention to provide a new and improved distributed social ad technology that may be easily and efficiently developed and marketed.

An even further object of the present invention is to provide a new and improved distributed social ad technology that has a low cost of manufacture with regard to both materials and labor, and which accordingly is then susceptible of low prices of sale to the consuming public, thereby making such distributed social ad technology economically available to the public.

Still another object of the present invention is to provide a new distributed social ad technology that provides in the apparatuses and methods of the prior art some of the advantages thereof, while simultaneously overcoming some of the disadvantages normally associated therewith.

Lastly, it is an object of the present invention to provide a new and improved computer program product for distributing advertisement for increasing click-thru-rate. The method comprises establishing communication between at least one user computing device and at least one website through a network, and displaying an ad to a user through the website. The user is then requested to participate in at least one event by way of the ad. After which, the most current result of the event are displayed to the user in real time.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
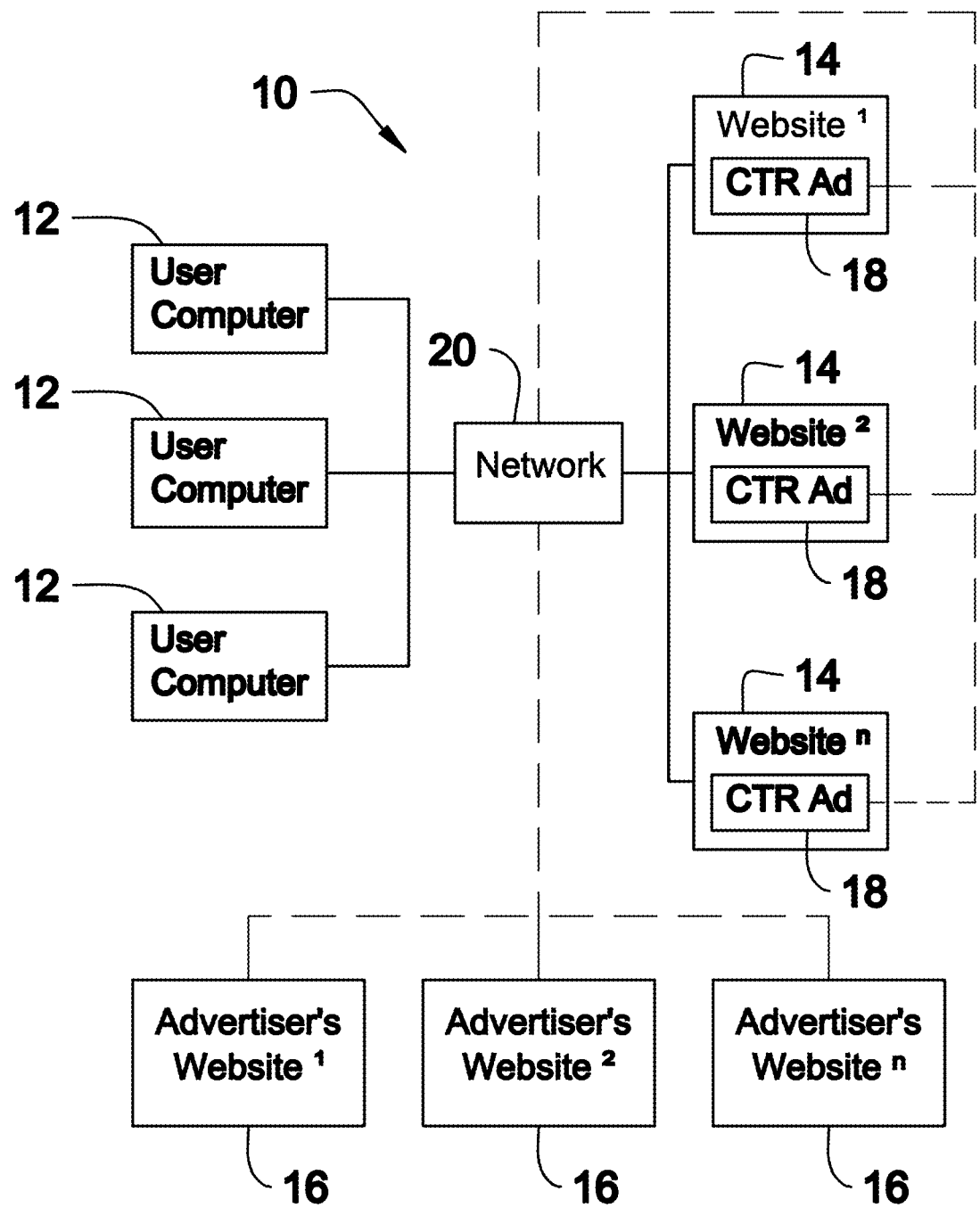
FIG. 1 shows a schematic diagram of present invention including a method of distributing social ad technology as described in one embodiment of the present invention.

Methods and apparatus, for increasing CTR compared to other types of online ads, are disclosed. The useful data and cognitive inputs gathered by DS Ad Tech can lead to additional monetization above and beyond that resulting from higher CTR. In FIG. 1, a new and improved DS Ad Tech 10 of the present invention for increasing CTR compared to other types of online ads is illustrated and will be described.

Typically, as shown in FIG. 1, DS Ad Tech 10 between users' computers/computing devices 12 and websites 14, 16 featuring CTR ads 18, proceeds through a network 20. The computing device 12 includes a processor and user input systems. The websites 14, 16 are stored on one or more computers, computing devices, servers or cloud-based systems, which are accessible from the network 20 or directly from the users' computers/computing devices 12. The network can be, but not limited to, a Web-deployed service with client/service architecture, a Local Area Network (LAN) or Wide Area Network (WAN), Wireless Local Area Network (WLAN), the Internet, or through a cloud-based system. Further, as will be understood and appreciated, various networking components like routers, switches, hubs etc., are typically involved in communication between users' computers/computing devices and internet websites. In one embodiment, the internet sources may include social media channels that include, but are not limited to, social networking sites (Facebook™, Orkut™, Twitter™, and MySpace™), Blogs, and video sharing sites (Youtube™). It can be appreciated that the user's computer or computing device 12 can be, but not limited to, desktop computers, laptops, cellular telephones, smartphones, multimedia devices, personal digital assistant (PDA) devices or any device capable of connecting and transferring data to and from a network.

The novelty of the invention lies partly in the insight that users are more likely to click on useful content than they are to click on an ad without useful content. So the first element of DS Ad Tech is to incorporate useful content within the ad system itself.

A second key element of DS Ad Tech is that the content is socially derived. That is, the content is dynamically generated based on the participation of many users across the internet, and across many varied platforms including mobile, embedded technology, and other internet access platforms. A third element of DS Ad Tech is that the act of clicking on the ad itself, helps contribute additional information which can make the information content of the ad even more valuable. This last element is important because it means that DS Ad Tech can benefit from network effects. That is, as more people click on a DS Ad Tech ad, the information displayed by the DS Ad Tech system becomes more valuable. This increase in value happens immediately and can result in a virtuous cycle: People click on DS Ad Tech ads because other people have already clicked and this results in more valuable information, which in turn causes even more people to click (who are seeking more valuable info) and so on.

Figure 2:
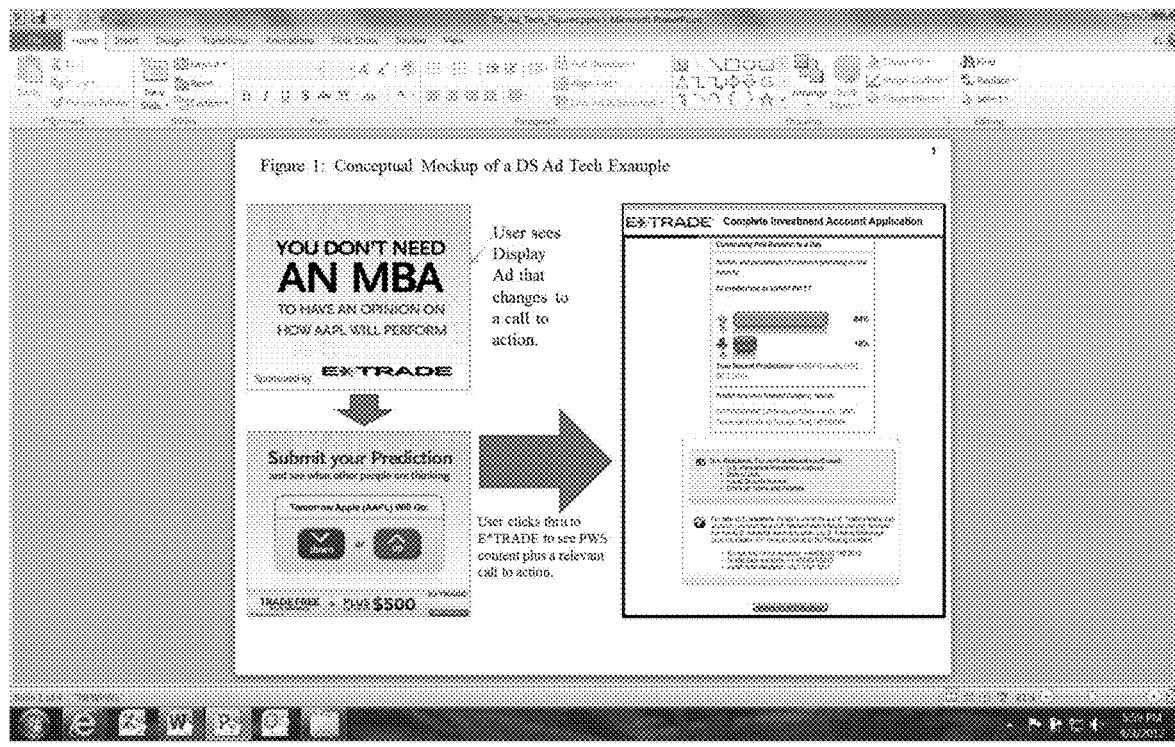
FIG. 2 illustrates a screen view of one instantiation of an embodiment of the distributed social ad technology constructed in accordance with the principles of the present invention.
Figure 3:
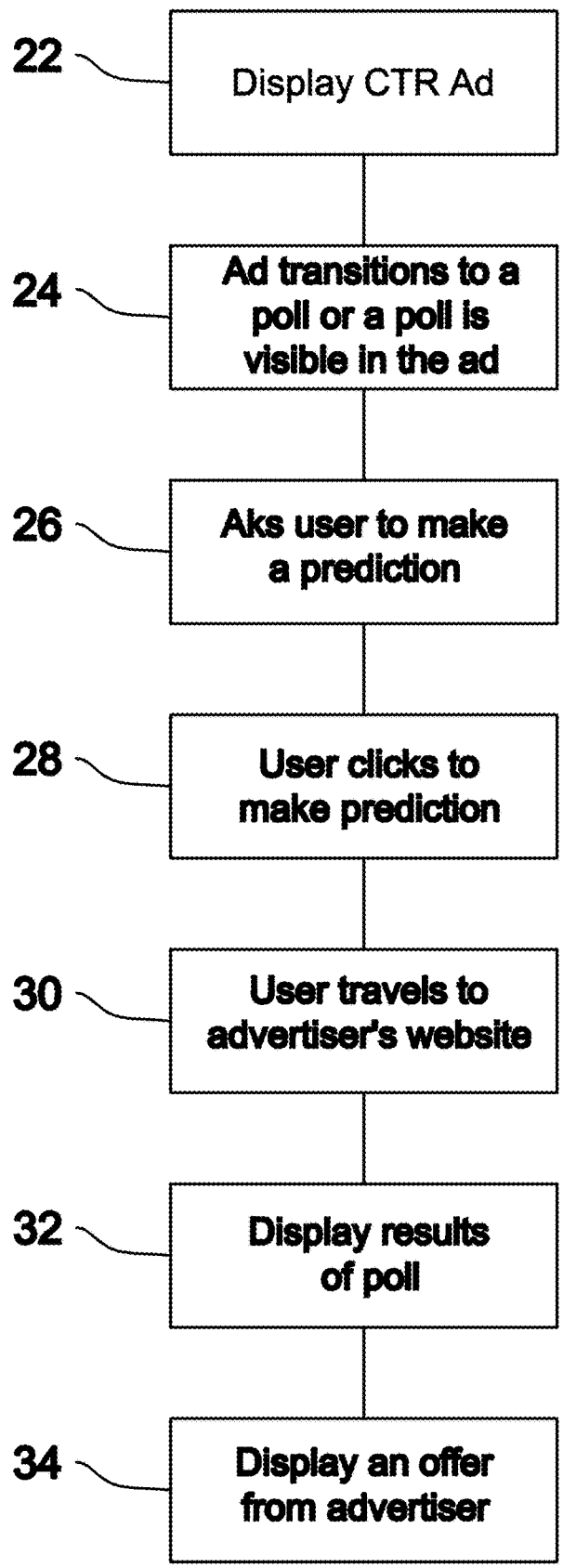
FIG. 3 illustrates a flow diagram depicting the user interaction with one implementation of the present invention.

A specific example may help at this point, however, it can be appreciated that this example is not to be interpreted as limiting the present invention. FIG. 2 represents a mockup of one instantiation of DS Ad Tech. In this example, as illustrated in FIG. 3, there is a display ad 22 that optionally fades to a poll 24. However, it can be appreciated that the poll 24 is visible inside the ad 22 from when the ad initially is displayed or during any time the ad is displayed. The poll asks the user to submit a prediction 26 on whether a particular stock will go up or down tomorrow. When the user clicks to make a prediction 28, the user travels to the advertiser's site 30 where the results of the poll are displayed 32, along with an offer by the advertiser 34. A key component of the DS Ad Tech system is that the user's click (the prediction of whether the stock would go up or down) can be incorporated in real-time into the poll results that the user sees on the advertisers' site. As more and more users click on the DS Ad Tech ads, more and more poll results are gathered and the poll becomes more and more valuable to each subsequent user. The increase in value stems from the fact that users are typically more interested in a poll with many participants than they are in a poll with a just a few participants. So as the number of participants increase, the value of the information displayed by the ad increases. As the value of the information increases, the CTR increases. So DS Ad Tech allows ads to increase their value (and CTR) as more people click on them—an extremely valuable and novel feature that is currently unknown in the online advertising domain.

It is important to realize that DS Ad Tech content is not limited to poll content. In fact, any type of content or information that can be contributed by users during the act of clicking on (or otherwise interacting with) the ad, can power the results that are displayed. These results can be processed simply (as in the case of a poll where the # of clicks is simply tabulated and then displayed) or in more sophisticated ways and/or in combination with other types of dynamically captured or pre-existing data. Some of the more sophisticated processing can include schemes for weighting and/or combining the information from users differently depending on their identities, demographic information, performance, online reputations, or behavioral characteristics.

Figure 4:
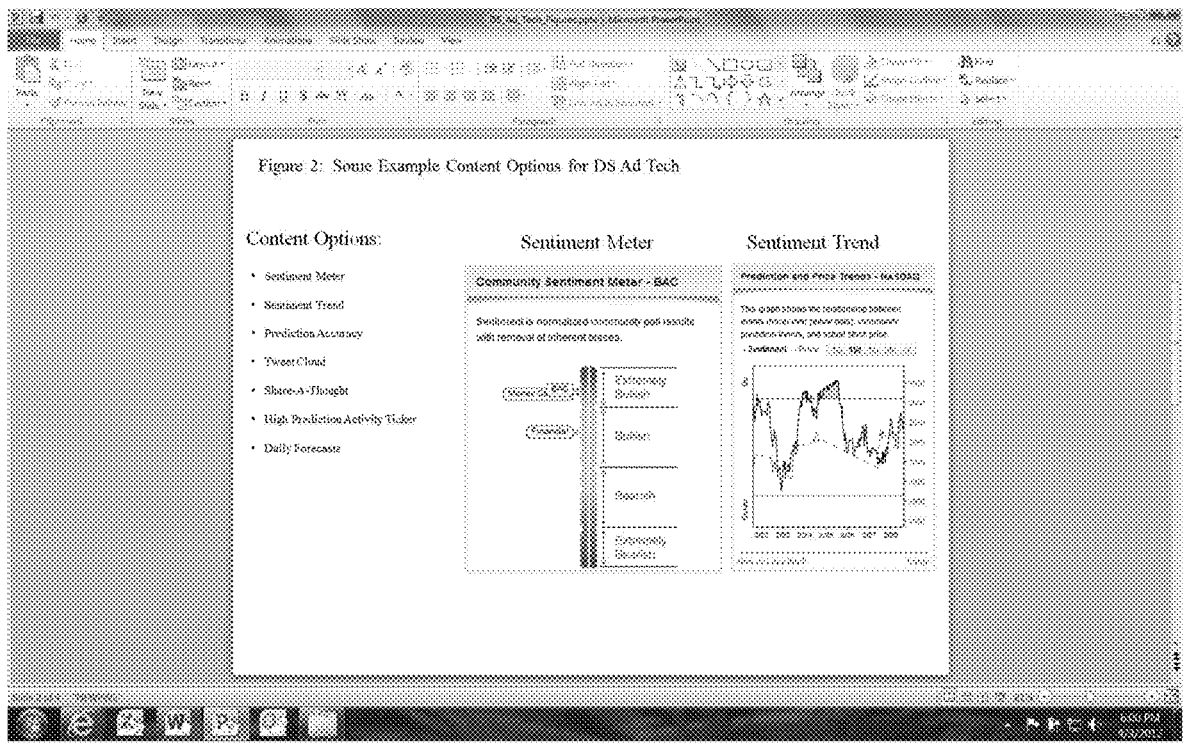
FIG. 4 illustrates a screen view of an example of processed content that can be derived from the stock prediction DS Ad Tech ad mentioned of the present invention.
Figure 5:
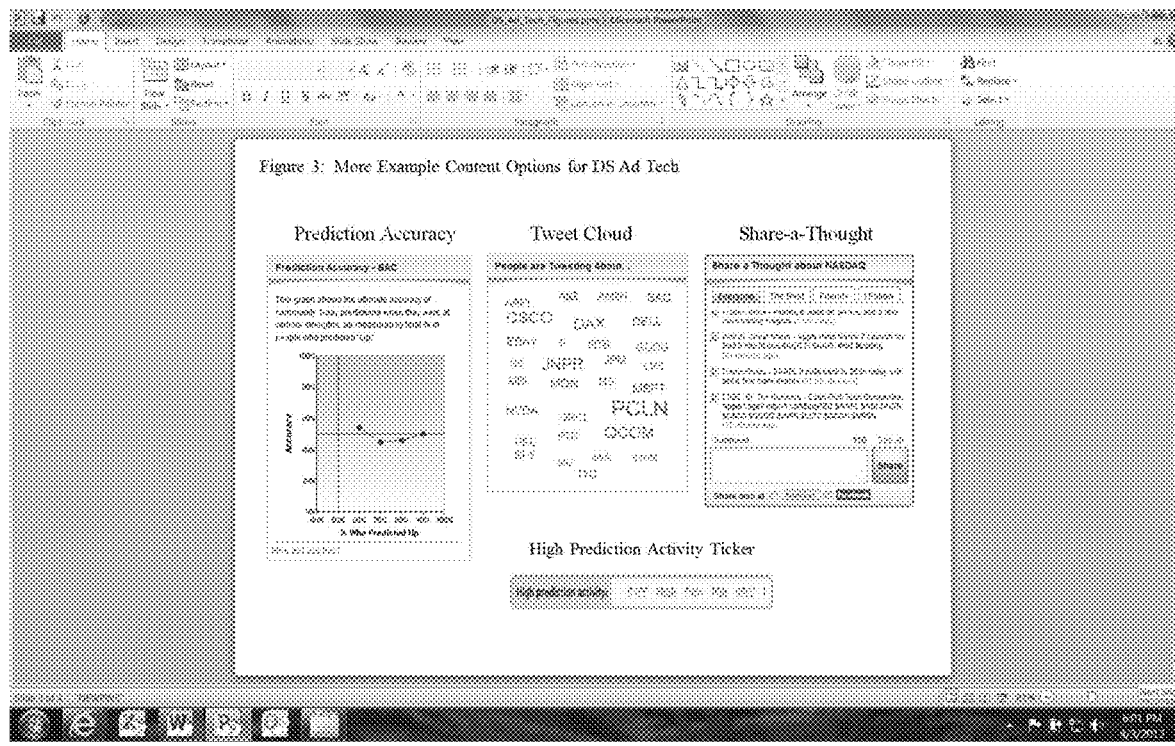
FIG. 5 illustrates a screen view of an example of processed content that can be derived from the stock prediction DS Ad Tech ad mentioned of the present invention.
Figure 6:
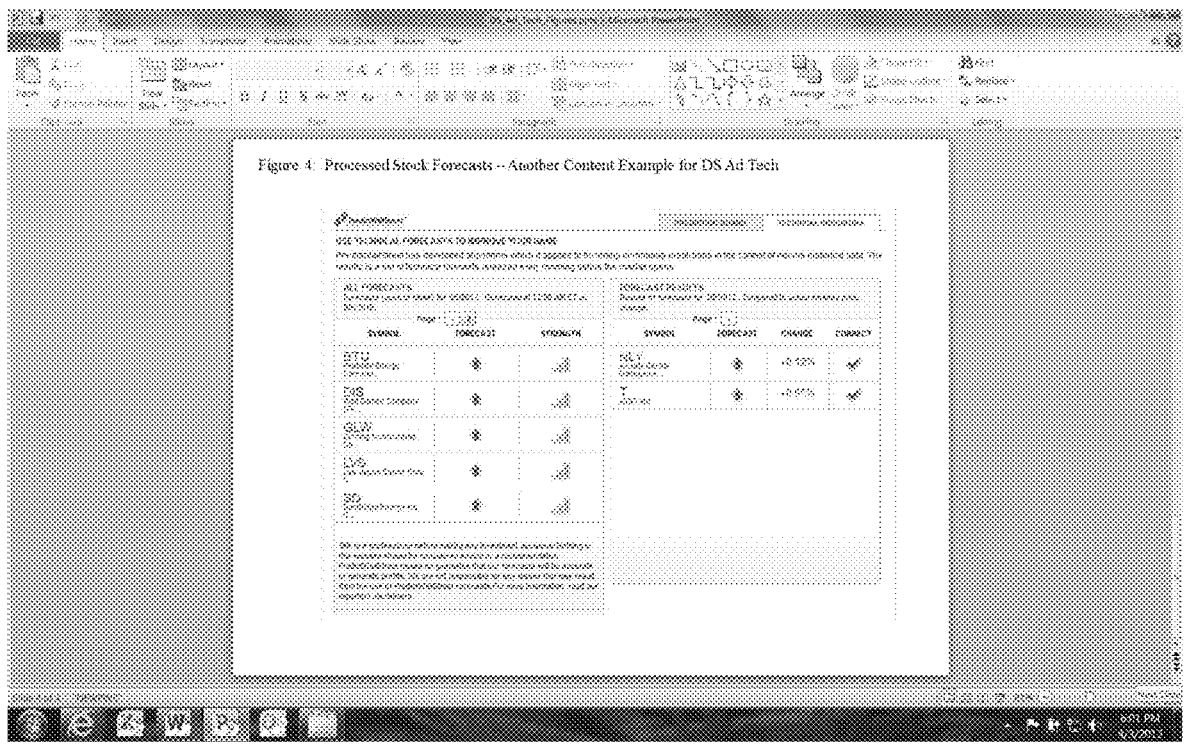
FIG. 6 illustrates a screen view of an example of processed content that can be derived from the stock prediction DS Ad Tech ad mentioned of the present invention.

For example, FIGS. 4-6 show other types of processed content that can be derived from the stock prediction DS Ad Tech ad mentioned in the example. By combining the stock predictions of users who click on the DS Ad Tech ad with existing historical stock prediction data, DS Ad Tech could display trends of how investor sentiment (predictions) have changed over time. Aggregating user predictions about a particular stock and comparing those predictions with the larger community's predictions about an index or groups of stocks allows comparisons of relative bullishness or bearishness on a stock versus its group. Information about the stock prediction accuracy of a user or group of users, information about the relative frequency of predictions on different stocks, comments from other users interested in the stock predicted by the DS Ad Tech user, stock forecasts derived from the collective processed input of the DS Ad Tech participants, and many other types of information can all be displayed in order to add additional value to the DS Ad Tech user.

In the preferred embodiment of the invention, DS Ad Tech leverages existing data from groups of users, or other existing sources, so that even the first user receives valuable and useful information. This data might have been captured in prior DS Ad Tech campaigns on similar topics or might be pre-existing from other sources.

The invention is not limited to a particular type of information gathering and processing (e.g. polls) but can be applied to other types of information gathering (e.g., gathering answers to a question, solutions to a problem, reactions to a picture or proposition, reaction time to a stimulus, and a wide array of other cognitive tasks). The essence of the invention is that DS Ad Tech requests cognitive participation and action of some kind from the user, the invention then processes that cognitive input together with the input of other users, and finally the invention displays the results in a way that is useful to the user. All of these things happen in the context of an online ad that has the capability to capture user input. As opposed to a regular ad where the click simply takes the user to a site, in DS Ad Tech, a click (or other input since text entry and other types of user input is also possible) results in capturing, processing, and displaying useful information together with the advertiser's call to action. A key element is that the useful information is dynamic and powered by the (processed) participation of many online users.

In one embodiment of the invention, the user provides input (e.g., clicks) and goes to the advertiser's site (as in FIG. 2). In another embodiment, the user provides input (e.g., clicks) and a window appears with the content and appeal from the advertiser. Other variations include selecting where to send users and/or what type of information to display based on the input from the user. For example, if users predict a stock will go up, they could be sent to a page with useful community derived information plus an offer related to buying stocks. If they predict a stock will go down, they could be sent to a page with useful community derived information plus an offer related to selling stocks or investing in securities that might help hedge against a decline in the market. It is possible to use the information provided by users of DS Ad Tech not only to create valuable content by processing information from many users in real-time, but also to tailor the content and experience of the individual user based on his or her input. Such tailoring and customization based on individual preferences and/or online behaviors are well known in the art but have not been combined with ads powered by individual and/or community input in real-time. In one embodiment of the invention, it is not just the individual's input, but rather the collective input of all the individuals clicking on a DS Ad Tech ad, that results in customized selection and/or display of information.

An additional benefit of DS Ad Tech, beyond the increase in CTR and ad effectiveness, is that useful information can be gathered from users with minimal expense. For example, a survey company interested in user opinions about a product might normally have to pay users to take a survey. By combining a simple survey question with an advertisement, useful data can be gathered at the same time that revenue is actually generated from the ad. That is, the survey not only pays for itself, it actually generates additional ad revenue. More generally, DS Ad Tech, which combines the capability of capturing useful cognitive work from users in the context of an ad, can generate two types of revenue: 1) The normal ad revenue typically paid by advertisers who are interested in high CTC, and 2) Other revenue which can be derived by processing the cognitive input of the users and turning this input into valuable information—some of which can be shared with users to increase CTC, and some of which might be resold or used in other ways to generate additional revenue.

Although examples in the area of stock prediction, were given for the sake of specificity and clarity, it is important to understand that the applications of DS Ad Tech are wide ranging and the invention can be applied to a wide range of advertisements. The prediction and poll applications alone can range over a wide range of subject matter including, without limitation, stocks, bonds, interest rates, prices, sports scores, weather, political actions, election results, box office success (e.g. of movies), award winners (e.g. country music awards, academy awards), product popularity and success, popularity of individuals or companies, research questions, and organizational voting.

Moving beyond polling, capturing other cognitive inputs—including, without limitation, suggestions, answers, solutions to problems, referrals to other individuals or organizations, estimates, ratings, rankings, reputational assessments—is also possible using the invention.

DS Ad Tech has the capacity to greatly increase the CTR, and therefore effectiveness of online advertising by transforming an advertising experience into an educational experience in which the user receives valuable information derived from online community input in real-time. Moreover, as more users participate in the DS Ad Tech system, the information becomes more valuable resulting in even higher CTR. DS Ad Tech represents a transformational technology in the online advertising industry and is especially relevant to social media advertising since it leverages the collective intelligence and input of groups and the larger distributed internet community.

While embodiments of the distributed social Ad technology have been described in detail, it should be apparent that modifications and variations thereto are possible, all of which fall within the true spirit and scope of the invention. And although increasing CTR compared to other types of online ads have been described, it should be appreciated that the distributed social Ad technology herein described is also suitable for gathering statistical or user information for marketing, political or polling surveys.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected is as follows:

1. A method of dynamically generating event result data in real time to optimize website user interaction with a first content, said method comprising the steps of:
    a) providing, by a website provider computer system, a first website including said first content associated with one or more advertiser websites;
    b) modifying, by said website provider computer server, said first content to include a user participation event, said user participation event including event content requesting user participation in a prediction event and two or more user selectable event data input link displayed on said first website;
    c) retrieving by a second computer system or said website provider computer system event data that includes existing historical data captured from at least one previous event participant that is determined by said second computer system or said website provider computer system to not be said user, said event data being extracted in response to an activation of said user selectable even data input link by a user, presented on a screen of a user computing device;
    d) retrieving by said second computer system or said website provider computer system that said user participated in said event by receiving user inputted event data from said user computing device;
    e) generating by said second computer system or said website provider computer system a new event data by modifying said event data to include said user inputted event data, wherein said second computer system or said website provider computer system further implementing one or more schemes in generating said new event data by weighting said event data and said user inputted event data depending on a category selected from the group consisting of identity, demographic information, performance, online reputation, and behavioral characteristic;
    f) generating by said second computer system or said website provider computer system event result data based on said new event data;
    g) modifying at least one advertiser website to include said event result data after said user participates in said event, wherein said advertiser website is selected based on said user inputted event data; and
    h) transmitting said modified advertiser website to said user computing device for display on said user computing device, wherein said transmitting is triggered by said activation of the said user selectable event data input link by the user.

2. The method of claim 1, wherein said user activates said user selectable even data input link by clicking on said user selectable event data input link.

3. The method of claim 1 further comprises, after step g), the step of communicating to said user computing device an offer from an advertiser by way of said modified advertiser website.

4. The method of claim 1, wherein said event result data is a total of results from said previous event participants that have participated in said event prior to said user participating in said event.

5. The method of claim 4 further comprises the step of storing said event result data from said user and said event data from said previous event participants remotely from said user computing device of said user.

6. The method of claim 1 further comprises, after step g), the step of collecting revenue from an entity associated with said first content or said advertiser website.

7. The method of claim 6 further comprises the step of collecting revenue derived by processing a cognitive input of users and turning said input into information.

8. The method of claim 6, wherein said information is one of shared with said previous event participants to increase click-thru-rate of said first content, and retailed to generate additional revenue.

9. A non-transitory computer readable media with an executable program stored thereon comprising instructions for execution by a processor of at least one computer, such that the instructions when executed by said processor cause said processor to:
    provide, by a website provider computer system, a first website including a first content associated with one or more advertiser websites;
    modify, by said website provider computer server, said first content to include a user participation event, said user participation event including event content requesting user participation in a prediction event and two or more user selectable event data input link displayed on said first website;
    retrieve by a second computer system or said website provider computer system event data that includes existing historical data captured from at least one previous event participant that is determined by said second computer system or said website provider computer system to not be said user, said event data being extracted in response to an activation of said user selectable even data input link by a user, presented on a screen of a user computing device;

determine by said second computer system or said website provider computer system that said user participated in said event by receiving user inputted event data from said user computing device;

generate by said second computer system or said website provider computer system a new event data by modifying said event data to include said user inputted event data, wherein said second computer system or said website provider computer system further implementing one or more schemes in generating said new event data by weighting said event data and said user inputted event data depending on a category selected from the group consisting of identity, demographic information, performance, online reputation, and behavioral characteristic;

generate by said second computer system or said website provider computer system event result data based on said new event data;

modify at least one advertiser website of to include said event result data after said user participates in said event, wherein said advertiser website is selected based on said user inputted event data; and transmit said modified advertiser website to said user computing device for display on said user computing device, wherein said transmitting is triggered by said activation of the said user selectable event data input link by the user.

10. The computer program product of claim 9, wherein the instructions when executed by said processor further causes said processor to transition said first event to said event content.

11. The computer program product of claim 9, wherein said user participates in said event by clicking on one of said user selectable event data input link.

12. The computer program product of claim 9, wherein the instructions when executed by said processor further causes said processor to communicate to said user computing device an offer from an advertiser by way of said modified advertiser website.

13. The computer program product of claim 9, wherein the instructions when executed by said processor further causes said processor to collect revenue from one of an entity associated with said first content or said advertiser website, and derived by processing a cognitive input of users and turning said user inputted event data into information, and wherein said event result data is a total of results from said users that have participated in said event prior to said user participating in said event.

14. A computer system comprising:

a website provider computer system including at least one computer processor hardware and a memory coupled to said computer processor hardware, said memory storing instructions that, when executed by said computer processor hardware, causes said computer processor hardware to:

provide a first website including a first content associated with one or more advertiser websites; and modify said first content to include a user participation event, said user participation event including event content requesting user participation in a prediction event and two or more user selectable event data input link displayed on said first website; and a second computer system including at least one second computer processor hardware and a second computer memory coupled to said second computer processor hardware, said second computer memory storing instructions that, when executed by said second computer processor hardware, causes said second computer processor hardware to:

retrieve event data that includes existing historical data captured from at least one previous event participant that is determined by said second computer system or said website provider computer system to not be said user, said event data being extracted in response to an activation of said user selectable even data input link by a user, presented on a screen of a user computing device;

determine that said user participated in said event by receiving user inputted event data from said user computing device;

generate a new event data by modifying said event data to include said user inputted event data, wherein said second computer system further implementing one or more schemes in generating said new event data by weighting said event data and said user inputted event data depending on a category selected from the group consisting of identity, demographic information, performance, online reputation, and behavioral characteristic;

generate by said second computer system or said website provider computer system event result data based on said new event data;

modify at least one advertiser website to include said event result data after said user participates in said event, wherein said advertiser website is selected based on said user inputted event data; and transmit said modified advertiser website to said user computing device for display on said user computing device, wherein said transmitting is triggered by said activation of the said user selectable event data input link by the user.

* * * * *